United States Patent
Larbier et al.

(10) Patent No.: US 8,279,944 B2
(45) Date of Patent: Oct. 2, 2012

(54) METHOD AND DEVICE FOR REGULATING THE ENCODING BIT RATE OF VIDEO IMAGE SEQUENCES RELATIVE TO A TARGET BIT RATE

(75) Inventors: Pierre Larbier, Bievres (FR); Marc Baillavoine, Buc (FR)

(73) Assignee: ATEME SA, Bievres (FR)

( * ) Notice: Subject to any disclaimer, the term of this patent is extended or adjusted under 35 U.S.C. 154(b) by 311 days.

(21) Appl. No.: 12/532,384

(22) PCT Filed: Mar. 20, 2008

(86) PCT No.: PCT/FR2008/050479
§ 371 (c)(1),
(2), (4) Date: Oct. 29, 2009

(87) PCT Pub. No.: WO2008/132378
PCT Pub. Date: Nov. 6, 2008

(65) Prior Publication Data
US 2010/0296586 A1  Nov. 25, 2010

(30) Foreign Application Priority Data
Mar. 21, 2007 (FR) ..................... 07 02063

(51) Int. Cl.
*H04N 21/2662* (2011.01)
(52) U.S. Cl. ............... 375/240.26; 382/232; 375/240.03
(58) Field of Classification Search .................. None
See application file for complete search history.

(56) References Cited

U.S. PATENT DOCUMENTS

| 5,057,916 | A  | * | 10/1991 | Krause et al. ............ 375/240.12 |
| 6,175,654 | B1 |   | 1/2001  | McVeigh |
| 6,272,249 | B1 | * | 8/2001  | Kobayashi et al. ........... 382/224 |
| 6,539,124 | B2 | * | 3/2003  | Sethuraman et al. ......... 382/251 |
| 2006/0056519 | A1 |   | 3/2006 | Horowitz et al. |
| 2007/0189623 | A1 | * | 8/2007 | Ryu ............................. 382/243 |

FOREIGN PATENT DOCUMENTS
WO   WO 00/46999 A   8/2000

OTHER PUBLICATIONS
International Search Report for related International Application No. PCT/FR2008/050479; report dated Oct. 13, 2008.

(Continued)

*Primary Examiner* — Christopher S Kelley
*Assistant Examiner* — Mohammed Jebari
(74) *Attorney, Agent, or Firm* — Miller, Matthias & Hull LLP

(57) ABSTRACT

The invention relates to a method and a device for regulating the encoding bit rate of video images relative to a target image size). The images being subdivided into zones to be encoded, the complexity of encoding of each zone is distinguished among the zones, the zones to be encoded are classified according to a determined order of complexity, each zone is successively encoded according to the decreasing order of complexity, successively minimizing the estimated encoding error of each zone, the final size of each image relative to the target size and the bit rate of the sequence of video images. Application to the video encoding of images of video sequences, in particular to networked video surveillance.

8 Claims, 5 Drawing Sheets

OTHER PUBLICATIONS

International Organization for Standardization = Organisation Internationale De Normalisation: "Test Model 5", MPEG Test Model 5. ISO-IEC/JTCI/SC29/WG11/N0400. Coded Representation of Picture and Audio Information. Document AVC-491B, Version 2: Apr. 1993, Geneva, ISO, CH, 1993, pp. 1-119, XP001150695—pp. 54-57.

"Text of ISO/IEC 14496-2 Visual Third Edition" Geneva: ISO, CH, 7 août 2003 (Aug. 7, 2003), XP030012728; pp. 663-675.

Schreier R. M., et al: "Motion Adaptive Intra Refresh for Low-Delay Video Coding" Consumer Electronics, 2006. ICCE 06, 2006; Digest of Technical Papers. International Conference on Las Vegas, NV, USA Jan. 7-11, 2006, Piscataway, NJ, USA, IEEE, Jan. 7, 2007, pp. 453-454, XP010896700. ISBN: 0-7803-9459-3; p. 249, alinéas II, III—p. 251.

* cited by examiner

IPPP...PPPIPPP...PPPIPPP...

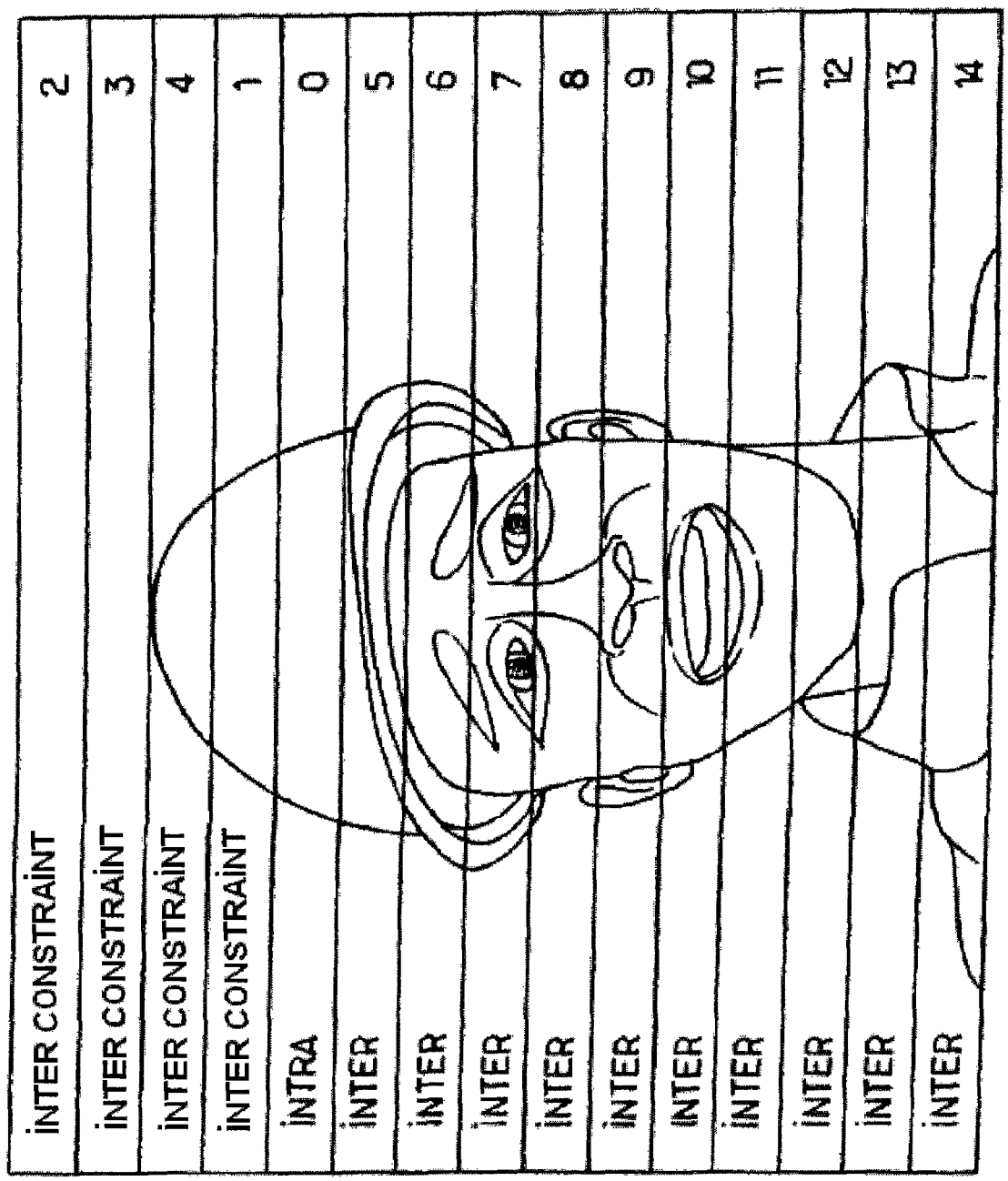

METHOD AND DEVICE FOR REGULATING THE ENCODING BIT RATE OF VIDEO IMAGE SEQUENCES RELATIVE TO A TARGET BIT RATE

CROSS-REFERENCE TO RELATED APPLICATIONS

This application is a U.S. national stage filing of International Patent Application No. PCT/FR2008/050479 filed on Mar. 20, 2008, which claims priority under the Paris Convention to French Patent Application No. 07 02063, filed on Mar. 21, 2007.

FIELD OF THE DISCLOSURE

The invention relates to encoding video image sequences, in particular regulating the encoding bit rate of video encoders, relative to a target bit rate.

BACKGROUND OF THE DISCLOSURE

As shown in FIG. 1a, a sequence of video images is composed of successive images, some of these images, denoted I images, being encoded in Intraframe mode, either without reference to the past represented by the previous images of this sequence of images, or in Interframe mode, denoted P images, then a new I image, and so on.

It will be recalled that the predictive encoding of the P images makes it possible to reduce substantially the volume of encoded data, while retaining a reasonable encoding complexity.

On the assumption that, due to processing requirements at decoding for example, it is desired to access a specific image having a defined rank in the video stream, and in the sequence of video images, it is then necessary to decode the set of P images preceding this image, until reaching the previous I image. Any I image is in fact by definition autonomous from the encoding point of view, since the encoding of the latter, which is not predictive, does not call on the content of any previous image.

In order to reduce or minimize the access time to an image of a determined rank, it is common, during the process of encoding video image sequences, to insert one I image every second, in the case of standard video encoding of films for example. In this situation, a maximum decoding requirement of no more than 25 images is assured, in the case of a video image stream of 25 images per second, in order to access any image whatever from the above-mentioned stream.

In these conditions, a stream of video images or video image sequences is called random access when any image is accessible within a technically acceptable timeframe. If on the contrary, no I images inserted into the video image stream or sequence, which can technically be envisaged, the stream cannot be regarded as random access, as the access to the content of any image of a determined rank theoretically depends on all the previous images.

At the present time, the encoding of constant-flow video streams or sequences is carried out on the basis of processes known from the prior art, as shown in FIG. 1b.

This process can consist of choosing a determined quantization step Q, from which it is estimated a priori that the latter will produce the desired image size.

Within the framework of severe constraints on the video stream or sequence, typically taking account of a very small encoded image buffer memory size at the level of the encoders or some commercially available decoders for example, the above-mentioned processes usually operate on the principle of a double iterative loop.

A first loop, shown in FIG. 1b, operates at the time level of the succession of images by:

1) allocating a target size $T_c$ for the encoding of the current image, $F_k$, k referencing the rank of the image, this estimated size being in relation to the current fullness status of the buffer memory of the encoder;

2) determining the quantization step Q applied according to the characteristics of the current image to be encoded, in particular its complexity C, and a computational model M linking the quantization step Q to the estimated size $\hat{T}$ and the complexity C of the image.

The computational model linking the estimated size $\hat{T}$ to the quantization step Q and the complexity C is applied by imposing $\hat{T}=T_c$ in order to find Q.

3) actual encoding of the current image $F_k$ by applying the quantization step Q;

4) updating the computational model M according to the actual size T of the current encoded image.

A second iterative loop applied at the spatial level of the current image $F_k$, the latter being divided into encoding blocks Bj, j denoting the rank of the block in the image to be encoded, makes it possible to determine the quantization step Qj to be applied to the considered block Bj, in order to strictly comply with the imposed bit rate constraint.

The second above-mentioned loop can operate in a similar fashion to the one shown in FIG. 1b, and therefore is not shown in the drawing. It is possible thereby for each block Bj of the current image to determine the quantization step Qj applicable to the latter as a function of its complexity Cj, the model M being adapted once the block Bj has been encoded.

The second above-mentioned loop allows a much stricter compliance with the bit rate constraint or set value. For a more detailed description of the above mentioned processes, reference can usefully be made to the text of the standard MPEG4: ISO/IEC 14496-2 Information Technology—Coding of audio visual objects—Part 2: Visual, Annexe L.

Due to the absence of predictive encoding, the I images, other factors being equal, occupy considerably more space than a P image. Within the framework of the standard H.264 defined by the recommendation ITU-T Rec.H.264, Annexe D.9.7, an I image occupies approximately 8 times more memory space than a P image of similar quality. The technical problem posed by compliance with the random access constraint by a video stream or sequence within the framework of the above-mentioned hypothesis can be summarized as follows: if I images are inserted with the aim of complying with the random access constraint, it is necessary to reduce the quality of the latter very substantially in order to avoid exceeding the size of the buffer memories. The resulting quality is then mediocre with, in particular, an especially impeding periodic visual degradation during the passage of reduced-quality I images.

Most recent video encoding standards propose encoding processes making it possible to encode an I image staggered over several P images, called progressive encoding. This new process makes it possible to dispense with the I-image concept.

In practice, each image of the video stream or sequence is subdivided into zones which are successively encoded by blocks in Intraframe mode, while ensuring on the one hand that at the end of a determined number of successive images all the zones of the image will have been encoded in Intra, the I image thus having been distributed over the determined number of images, and on the other hand, that the parts of images encoded in Interframe mode do not use the zone that has not yet been refreshed, in order to retain the information passed from the predictive coding.

In the above-mentioned standard H.264, the video encoder can signal to the video decoder that it is transmitting this type of image with progressive encoding. Thus on reception the video decoder can synchronize on these images, in order to guarantee a random access to the stream. For a more detailed description of the standard H.264 and the progressive encoding process, reference can usefully be made to the text of the above-mentioned recommendation ITU-T Rec.H.264, Annexe D.9.7.

Although the progressive encoding process of I images makes it possible to some extent to comply with a constraint in terms of video image bit rate, while guaranteeing a random access to the video stream, the process of successive encoding of the blocks, according to a geometrical scanning of the image from top to bottom, does not give total satisfaction and does not make it possible to comply with the bit rate constraint with a low margin of error in terms of the target image size.

The bit rate control process in this situation in fact makes use of the computational model, shown and described in connection with FIG. 1b.

The above-mentioned computational model is affected by a certain absolute error $\epsilon$, which becomes greater as the estimated size $\hat{T}$ of the image increases.

Thus the size T of each encoded image verifies the following relationship (1):

$$T = \hat{T} + \epsilon$$

in which T denotes the actual size of the image after encoding, $\hat{T}$ the estimated size of the image given by the computational model and $\epsilon$ the absolute encoding error on the size, a strictly increasing function of the size T.

Taking account of the successive geometrical encoding from top to bottom of the blocks or zones to be encoded, when the bottom of the image, the last zones of the latter to be encoded, has a high complexity, it can be concluded that the absolute size error $\epsilon$ introduced by the computational model is high. In fact, as this zone is encoded last, the absolute error cannot in any way be compensated for by the encoding of other zones, the quality of which could be reduced, for example, in order to reduce the size of the encoded image finally achieved. Consequently this results in a risk of exceeding the capacity of the buffer memories, and degradation of the conditions of transmission, in particular the fluidity of the video stream or sequence.

Currently, no procedures are known that allow fine regulation of the encoding bit rate of video streams or sequences to be carried out while retaining random access to the latter.

SUMMARY OF THE DISCLOSURE

A subject of the present invention is to remedy the drawbacks and limitations of the prior art, with the aim of ensuring regulation that is as fine as possible of the bit rate of video streams or image sequences, in particular encoded using progressive coding.

A further subject of the present invention is also the implementation of a method and device for regulating the encoding bit rate of video streams or image sequences making it possible to minimize the absolute encoding error of any image, independently of the complexity of the considered image.

A further subject of the present invention is finally the implementation of the method and device that are subjects of the invention in an application to networked remote video surveillance, as a result of which the fine regulation of the bit rate makes it possible to avoid any image transmission collision and promote real-time control of any surveillance element.

The method and device for regulating the encoding bit rate of video image sequences with respect to a target bit rate, represented by a target image size, that are subjects of the invention, operate on video images subdivided into a set of zones to be encoded. The estimated size of the set of zones to be encoded is related to the size of the encoded zones, the estimated size of the zones to be encoded and an estimated encoding error for the zones to be encoded.

They are remarkable in that each one respectively consists of making it possible to distinguish, between the zones to be encoded from this set of zones to be encoded, the encoding complexity of each zone to be encoded, to classify the zones to be encoded according to a determined order of complexity, to successively encode each zone to be encoded according to the decreasing order of complexity classification, successively minimizing the estimated encoding error of each zone to be encoded and the final size of each image in relation to the target size, and optimizing the bit rate of the video image sequence.

The method and device that are the subject of the invention are moreover remarkable in that, within the framework of an application to networked video surveillance, including a remote control of a video surveillance camera from a host terminal by an operator, each respectively consists of and makes it possible, for each current image of rank p belonging to successive sequences of N images $1 \leq p \leq N$, to subdivide each current image into a set of N superimposed zones to be encoded, each constituted by a plurality of lines of pixels, to distinguish the encoding complexity of each zone to be encoded among the zones to be encoded, to choose one of the zones to be encoded as the first zone to be encoded and apply an Intraframe coding, with a minimum quantization step, in order to obtain a maximum encoding complexity for this first zone to be encoded, encoding the zone to be encoded immediately above this first zone, using Interframe encoding, applying a reduced quantization step, in order to retain the fineness of encoding of this zone, encoding each of the remaining zones to be encoded using Interframe encoding, according to their order of complexity classification, successively minimizing the estimated encoding error of each remaining zone to be encoded, the final size of the current image with respect to the target size, successively repeating the previous operations for each image of rank p+1, following the current image, choosing as the first zone to be encoded one of the zones to be encoded having a rank different from the rank of the zones encoded as first zone to be encoded from the preceding p images. This makes it possible to retain the random access to the image sequences.

The method and device that are the subject of the invention can be applied to the technology of video encoding, the transmission of video streams in a network and their applications, such as in particular, networked video surveillance.

BRIEF DESCRIPTION OF THE DRAWINGS

They will be better understood on reading the description and viewing the drawings below, in which in addition to FIGS. 1a and 1b relating to the prior art:

FIG. 3b shows, for the purposes of illustration, a specific example of implementation of the method that is the subject of the invention applied to networked video surveillance;

DETAILED DESCRIPTION OF THE DISCLOSURE

A more detailed description of the method and device for regulating the encoding bit rate of video image sequences, with regard to a target bit rate represented by a target image size, according to the subject of the present invention, will now be given with reference to FIG. 2a and the following figures.

The method that is the subject of the invention is applied as previously stated in the description to regulating the bit rate of encoding of video image sequences with regard to a target bit rate represented by a given image target size $T_c$.

It is understood in particular that for a given target size $T_c$ for each image, and taking account of the frequency of the image in the sequence of images, an encoding bit rate is thus determined for the sequence or stream of considered images.

Figures 1A, 1B:
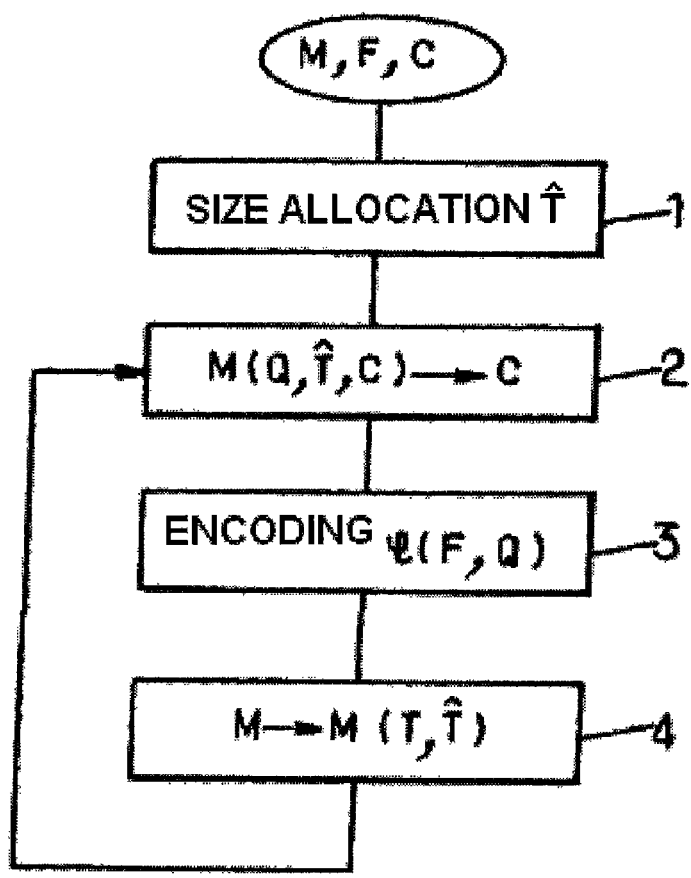
Figure 2B:
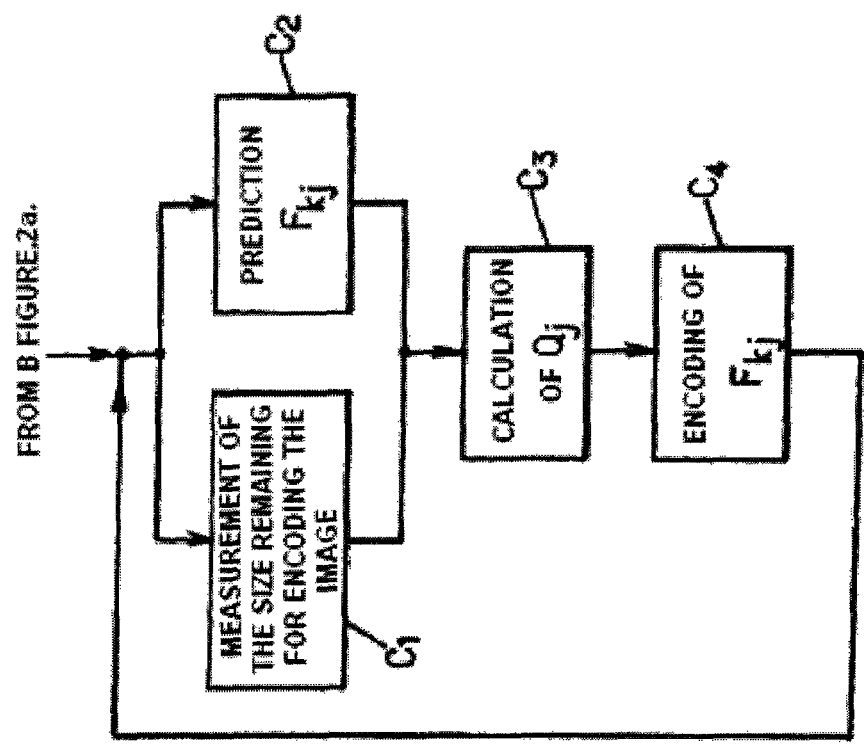
FIG. 2b shows, for the purposes of illustration, a specific flowchart making it possible to carry out a minimization of the estimated encoding error for each zone to be encoded.
Figure 2A:
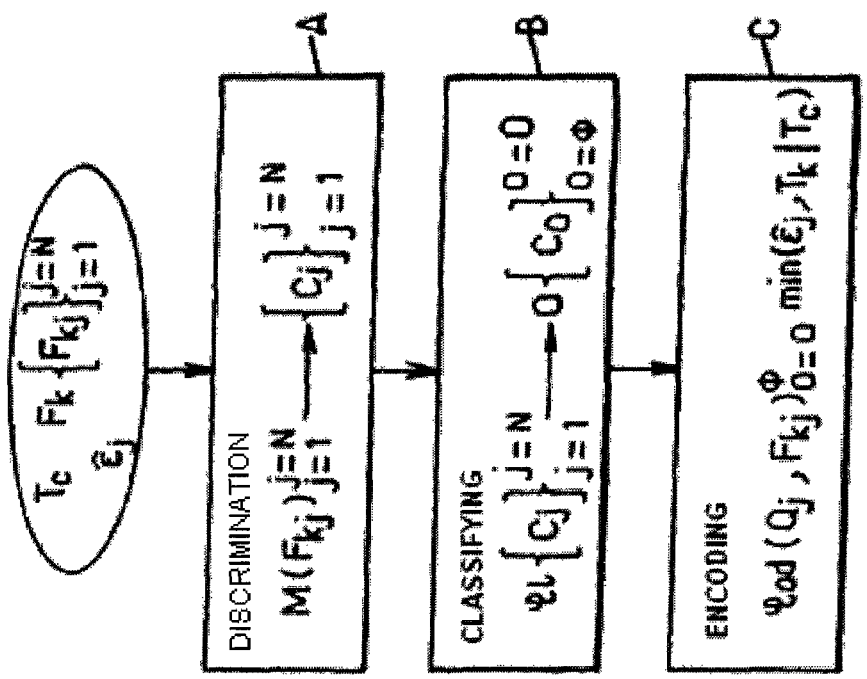
FIG. 2a shows, for the purposes of illustration, a general flowchart of the essential steps enabling implementation of the method that is the subject of the present invention.

Thus, with reference to FIG. 2a, any image $F_k$, is considered, k denoting the rank of the considered image in the above-mentioned sequence of images, each video image being subdivided into a set of zones to be encoded, this set being denoted $\{F_{kj}\}_{j=1}^{j=N}$, referencing the number of zones to be encoded in each considered image $F_k$ and $F_{kj}$ referencing each zone to be encoded of the above-mentioned image.

Thus the estimated size of the set of zones to be encoded $\{F_{kj}\}_{j=1}^{j=N}$, is related, during the encoding process, to the size of the already-encoded zones, the estimated size of the zones to be encoded or those remaining to be encoded, and an estimated encoding error of the zones to be encoded, the estimated encoding error being denoted $\hat{\epsilon}_j$ for each of the zones to be encoded with reference to FIG. 2a.

As shown in the further above-mentioned FIG. 2a, the method that is the subject of the invention is remarkable in that it consists at least, for each image $F_k$ prior to any encoding of a zone, of discrimination in a step A, among the zones to be encoded from the set of zones to be encoded $\{F_{kj}\}_{j=1}^{j=N}$, the encoding complexity of each zone to be encoded $F_{kj}$. In step A of FIG. 2a, the discrimination operation is denoted:

Discrimination $$M(F_{kj})_{j=1}^{j=N} \rightarrow \{C_j\}_{j=1}^{j=N}.$$

In step A, it is understood that the application of a computational model M to the set of the zones to be encoded $F_{kj}$ makes it possible to obtain a set of encoding complexity coefficients for each zone to be encoded, this set being denoted $$\{C_j\}_{j=1}^{j=N}.$$

The operation of step A is followed by a step B consisting of classifying the zones to be encoded according to a determined order of complexity.

The corresponding operation in step B is denoted Classifying $$Cl\{C_j\}_{j=1}^{j=N} \rightarrow O\{C_o\}_{o=\sigma}^{=O}.$$

It is understood that by the above-mentioned classifying operation, the latter consists of classifying the encoding complexity coefficients $C_j$ obtained in step A by order of magnitude, the order of magnitude classification being capable a priori of being carried out according to an increasing or decreasing order.

In the operation shown in step B of FIG. 2a, application of the classifying or sorting function of the encoding complexity coefficients $C_j$ makes it possible to obtain a set of values sorted by increasing or decreasing order denoted $$O\{C_o\}_{o=\sigma}^{=O}.$$

The above-mentioned step B is then followed by a step C consisting of successively encoding each zone to be encoded according to the decreasing complexity order classification of the encoding complexity coefficients $C_j$ obtained in step B.

The successive operation of encoding each zone to be encoded according to the decreasing complexity order classification shown in step C is denoted Encoding $$Cod(Q_j, F_{kj})_{o=0}^{o=\sigma}, \min(\hat{\epsilon}_j, T_k | Tc).$$

The above-mentioned encoding operation consists in fact, as shown in step C of FIG. 2a, of carrying out the encoding by applying a quantization step $Q_j$ to each zone to be encoded $F_{kj}$ and successively minimizing the estimated encoding error $\epsilon_j$ of each zone to be encoded $F_{kj}$, the final size of each image after encoding, final size denoted $T_k$, with regard to the target size Tc and finally optimizing the bit rate of the corresponding sequence of video images.

A statement of the mode of operation of the method for regulating the encoding bit rate of sequences of video images, that is the subject of the present invention, as shown in FIG. 2a, will now be given on a theoretical level, according to the following description.

For a set $\{F_{kj}\}_{j=1}^{j=N}$, of N image zones to be encoded, in the case of the encoding of the prior art, each zone to be encoded $F_{kj}$ is encoded successively one after another with no account being taken of their complexity.

Thus in order to adjust the encoding parameters of a zone to be encoded, $F_{kj}$ and for a current zone of rank i, the size of the above-mentioned set of zones to be encoded is estimated, which is broken down into two parts, the size of the previously-encoded zones which is known and the estimated size of the zones remaining to be encoded according to the relationship (2)

$$\hat{T} = \sum_{i<j} Ti + \sum_{j\geq i} \hat{T}_j$$

$$\hat{T} = \sum_{i<j} Ti + \sum_{j\geq i} Tj + \sum_{j\geq i} \hat{\epsilon}_j = \sum_{N} Ti + \sum_{j\geq i} \epsilon_j$$

The estimated size of the zones remaining to be encoded $\hat{T}$ compared to the target size $T_c$ serves to adjust the encoding parameters, such as the quantization step for the current zone of rank i to be encoded.

In order to minimize the encoding error of the size remaining to be encoded, it is fundamental for the error affecting the latter to be minimal, this error being expressed in the form of relationship (3) below:

$$\sum_{j \geq i} \varepsilon_j$$

Minimizing the above-mentioned error term thus amounts to minimizing all the encoding error values $\varepsilon_j$ of each zone to be encoded $F_{kj}$.

The encoding errors $\varepsilon_j$ are proportional to the sizes T of each zone and therefore to the complexity of each of the zones to be encoded $F_{kj}$.

In view of this observation, the method that is the subject of the invention makes it possible, on the contrary, to cut a sequence of video images to be encoded into zones to be encoded, to classify the complexity of the corresponding zones to be encoded and to encode the above-mentioned sequence of images in order of decreasing complexity, in order to start the encoding with the zones occupying the most space and finishing with the image zones to be encoded that occupy the least space.

By encoding the more complex zones first, the encoding error $\varepsilon_j$ can thus be minimized as the encoding of the successive zones progresses.

Thus, the last zones to be encoded then have two advantages: they have a very reliable estimate of the remaining size, and, having successively lower complexity, their encoding error is low and it is therefore not very likely that the error affecting them would result in exceeding the target size of the image Tc and thus of the buffer memories.

More specifically, it is stated that the encoding complexity of each zone to be encoded $F_{kj}$ is defined as the estimated size, in bytes, occupied after encoding by the above-mentioned zone to be encoded, for a determined zone and image quality.

By way of a non-limitative example, it is stated that the encoding complexity $C_j$ of each zone to be encoded can be estimated from at least the quantization step $Q_j$ to be applied during the encoding and metrics process of the zone to be encoded of the current image $F_k$, relative to at least one encoded zone of the previous image.

Thus in a known manner, in order to estimate the encoding complexity of each zone to be encoded, it is possible to use a process known in the state of the art in the field of video encoding, making it possible to link the estimated image size to the quantization step and to metrics over the zone to be encoded, the size of the zone to be encoded being expressed by the relationship (4) below $$Te = (a*C/Q) + b*C/Q*Q)).$$

In the previous relationship,
Te denotes the estimated size of the zone to be encoded $F_{kj}$;
C represents its complexity, typically the absolute value sum of the differences denoted SAD;
Q represents the quantization step applied over the zone to be encoded $F_{kj}$;
a and b are parameters linked to the sequence of images dynamically adjusted during encoding.
For a more detailed description of the size determination of each zone to be encoded according to the complexity of the latter, reference can usefully be made to annexe L paragraph L.1.2 of standard MPEG4 already cited, for example.

A more detailed description of the process implemented for minimizing the estimated encoding error of each zone to be encoded is now given, in connection with FIG. 2b.

With reference to the above figure, it is stated that the process making it possible to minimize the estimated error of each zone to be encoded $F_{kj}$ consists at least of successively adapting the quantization step $Q_j$ applied to the encoding of each zone to be encoded $F_{kj}$.

To this end, as shown in FIG. 2b and following the execution of step B of FIG. 2a, step C of the above-mentioned FIG. 2a can consist, as shown in FIG. 2b, of executing jointly a step $C_1$ consisting of measuring the remaining size for encoding the image with regard to the target size $T_c$ of the image and a step $C_2$ consisting of executing the operation of prediction of the zone to be encoded $F_j$, as shown in FIG. 2b. The above-mentioned prediction operation is executed when an Inter-frame encoding is executed, for example.

The above-mentioned steps $C_1$ and $C_2$ are then followed by a step $C_3$ of computing the quantization step $Q_j$ from the preceding relationship (4).

Step $C_3$ is then followed by a step $C_4$ making it possible to carry out the encoding properly so called of the zone to be encoded $F_{kj}$ by applying the quantization step $Q_j$ determined in step $C_3$.

A return to the execution of steps $C_1$ and $C_2$ is provided for encoding the following zone to be encoded, as shown in the drawing in FIG. 2b.

The method that is the subject of the invention as described previously in connection with FIGS. 2a and 2b can be implemented in order to ensure a substantially constant encoding bit rate of video images for the transmission of the latter.

However, the process that is the subject of the invention is applicable in a particularly advantageous fashion to networked video surveillance in order to ensure, in particular, the transmission of sequences of images allowing surveillance elements to be controlled, for example.

Thus the existence is envisaged of video surveillance equipment provided with a camera control system, an operator being able to decide on remote movements of the latter at any time.

Between the surveillance camera and the user operator, the video signal, i.e. the successive sequences of video images, is compressed for example to the standard H.264.

Within the framework of an application to video surveillance, it is clear that the video stream must be random-access, in order in particular to facilitate viewing of the events that occurred at a given moment or within a very short timeframe during a given moment, and it is thus fundamental that the bit rate is complied with very precisely.

In fact, if the latter is not complied with, the network equipment will send a part of the video image stream to the buffer memory, or worse, the stream is then lost. The video sequence then experiences a delay in relation to the filmed scene, and the operator cannot effectively control his surveillance camera.

The application of the process that is the subject of the invention to networked video surveillance appears particularly advantageous, as the method that is the subject of the invention in this application thus makes it possible to resolve all the above-mentioned constraints, both as regards random access to the sequences or streams of video images and rigorous compliance with bit rate constraints, in order to avoid the drawbacks previously mentioned.

To this end, the method that is the subject of the invention thus consists of encoding a part of a considered image in Intraframe mode so that the whole of the image has been encoded in Intraframe mode at the end of a number N of successive images.

Moreover, in order to guarantee random access to the stream of video images, it is imposed that no spatial or temporal prediction is carried out between the refreshed zone, that is, the set of zones which have been encoded in Intra from the start of the progressive refreshing, that is to say over the successive p images, and the remainder of the image. The method that is the subject of the present invention applied to video surveillance is then implemented, as will be described in connection with FIG. 3a below.

With reference to the above-mentioned figure, a stream of video images is considered, each video image being denoted $F_k$ as previously noted, k referencing the rank of the image for example. Moreover, any successive sequence of N images in the above-mentioned video stream is considered, each image in each sequence of N images being denoted $F_p$, where p denotes the rank of each image in the considered sequence.

By way of a non-limitative example, the rank p of each image then verifies the relationship p=1+k mod N.

According to the adopted notation, k mod N denotes the remainder of the division of k by N.

Thus the rank p of each image in the sequence of N images verifies the relationship (5):

$$1 \leq p \leq N.$$

Figure 3A:
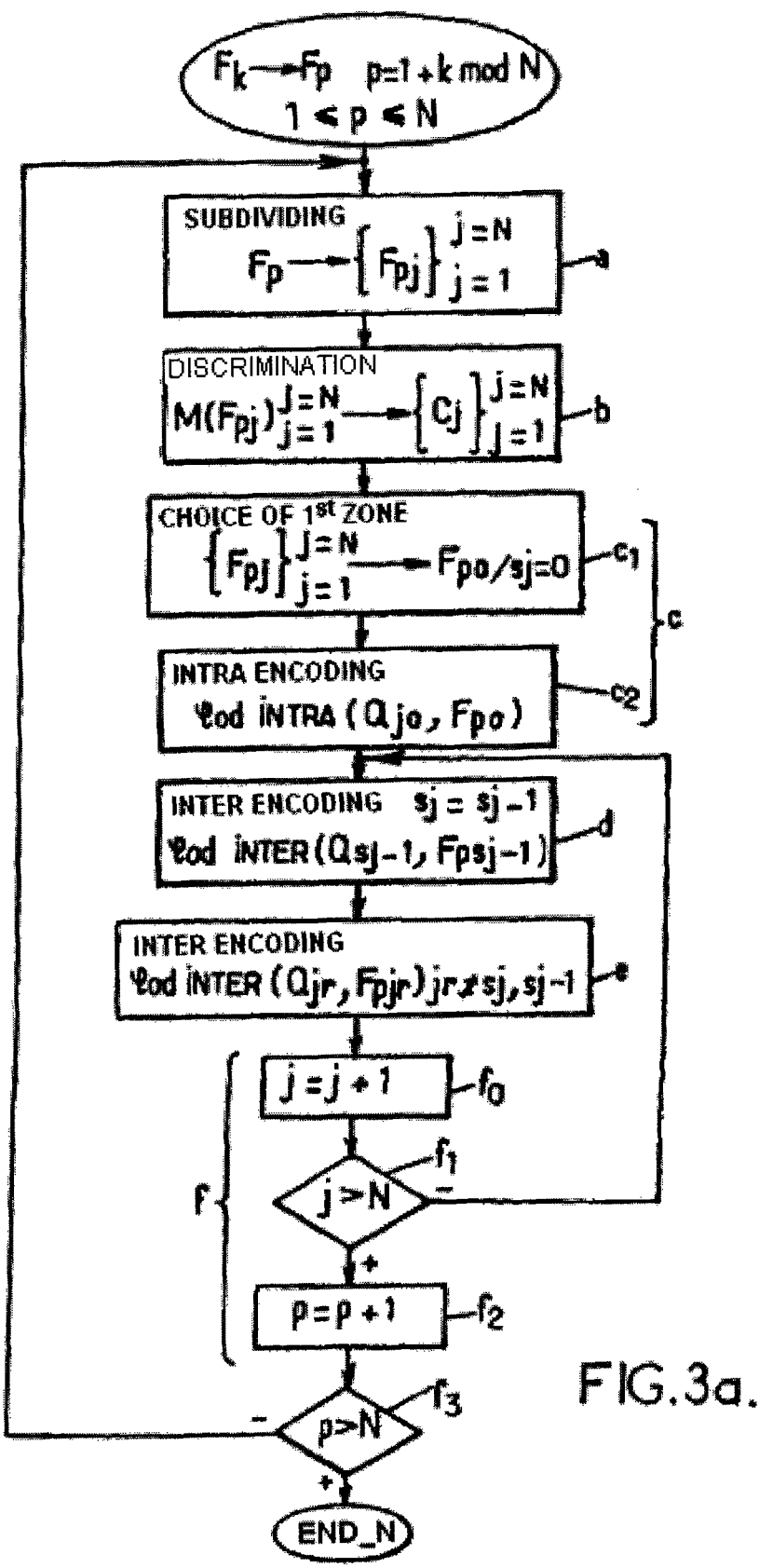
FIG. 3a shows, for the purposes of illustration, a specific flowchart of the essential steps for implementing the method that is the subject of the invention in a networked video surveillance application.

With reference to FIG. 3a, the method that is the subject of the invention applied to video surveillance then consists of a step a for subdividing each current image into a set of N superimposed zones to be encoded, each zone being constituted by a plurality of lines of pixels.

In step a in FIG. 3a, the subdivision operation is denoted:
Subdividing $$F_p \rightarrow \{F_{pj}\}_{j=1}^{j=N}.$$

Step a is followed by a step b consisting of discrimination, among the zones to be encoded $F_{pj}$, the encoding complexity of each zone to be encoded. This operation is denoted in FIG. 3a Discrimination $$M(F_{pj})_{j=1}^{j=N} \rightarrow \{C_j\}_{j=1}^{j=N}.$$

Step b is followed by a step c consisting of choosing one of the zones to be encoded as the first zone to be encoded and applying an Intraframe encoding with a minimum quantization step in order to obtain a maximal encoding complexity for the above-mentioned first zone to be encoded.

In FIG. 3a, step c is thus subdivided into two sub-steps c1 of choosing the first zone, denoted Choosing the First Zone $$\{F_{pj}\}_{j=1}^{j=N} \rightarrow F_{p0} | sj=0$$

By the choice of the above-mentioned first zone, it is understood that the first zone to be encoded of the image is arbitrarily assigned a rank 0, the index j chosen such that sj=0 representing this choice in FIG. 3a.

The sub-step c1 is followed by a sub-step c2 consisting of carrying out an Intraframe encoding of the chosen first zone, this operation being denoted in sub-step c2:

Intra Encoding $$Cod_{INTRA}(Q_{j0}, F_{p0}).$$

It is understood that, by the Intraframe encoding applied to the first zone, the minimum quantization step denoted $Q_{j0}$ is applied, which makes it possible to obtain a maximum encoding complexity for the first zone to be encoded.

The above-mentioned step c is then followed by a step d consisting of encoding in Interframe encoding the adjacent zone to be encoded immediately above the first zone, applying a reduced quantization step in order to retain the details of this zone which, in the previous image, was encoded in Intraframe mode.

The operation in step d of FIG. 3a is denoted

Inter encoding sj=sj−1 the symbolic notation of choice of the zone to be encoded of rank j−1 referencing the choice of the adjacent zone to be encoded immediately above the first zone by the symbolic assignment sj=sj−1.

The Interframe encoding is then denoted $$Cod_{INTER}(Q_{sj-1}, F_{psj-1})$$

The quantization step $Q_{sj-1}$ is reduced with respect to the quantization step $Q_{j0}$ applied to the sub-step c2 in FIG. 3a in the first zone.

This makes it possible to retain the details of this zone which, in the previous image, was encoded in Intraframe mode.

Step d is then followed by a step e consisting of encoding in Interframe encoding each of the remaining zones to be encoded according to their decreasing order of complexity classification, as described previously in the description in connection with FIGS. 2a and 2b.

Of course, this operation is executed by successively minimizing the estimated encoding error of each remaining zone to be encoded and the final size of each current image with regard to the above-mentioned target size.

In step e of FIG. 3a, the Interframe encoding operation is denoted

Inter Encoding $$Cod_{INTER}(Q_{jr}, F_{pjr}) \; jr \neq sj, sj-1.$$

In the above relationship, it is understood that the encoding operation is applied with a quantization step $Q_{jr}$ to each of the remaining zones to be encoded having the index jr, of course choosing the corresponding quantization step $Q_{jr}$.

The relationship jr≠sj, sj−1 references each of the remaining zones to be encoded having rank jr that are different from the first zone sj=0 and sj−1, the adjacent zone immediately above the above-mentioned first zone.

Of course, the quantization step $Q_{jr}$ is calculated for each of the remaining zones having rank jr.

Step e is then followed by a step f consisting of successively repeating operations a to e for each image of rank p+1 following the current image, choosing as first zone to be encoded one of the zones to be encoded having a different rank, among the preceding p images, from the rank of the zones encoded as first zone to be encoded.

This procedure makes it possible to retain random access to the sequences of images.

By way of non-limitative example, for executing step f comprising the return to the start, i.e. to the execution of step a, for the following image, the operation f can comprise, as shown in FIG. 3a, a sub-step $f_0$ consisting of passing to the following zone to be encoded:

$$j=j+1$$

followed by a test step $f_1$ consisting of verifying the rank j of the zone in relation to the value N. On a negative response to the test $f_1$, the process is continued by returning to step d in order to pass to the following zone to be encoded.

On the contrary, on a positive response to the test $f_1$, all the zones to be encoded of the current image of rank p having been encoded, there follows a step $f_2$ of passing to the following image by the relation p=p+1.

The sub-step $f_2$ is followed by a sub-step $f_3$ verifying that the last image of the sequence of N images has not been reached by the test p>N. On a negative response to the sub-step $f_3$, a return takes place to step a in order to pass to the following image of rank p+1.

On the contrary, on a positive response to the sub-step $f_3$, the last image of rank N in the sequence of images is reached and the process is terminated for the above-mentioned sequence of N successive images, the process of course continuing for any following sequence of images of the video image stream.

As regards the implementation of step c1 of choosing the first image zone to be encoded, it is stated that several solutions can be adopted for each successive image of rank p in a sequence of N images.

According to a first non-limitative variant, this choice can be effected by circular permutation of a zone to be encoded from N.

It is also understood that, by such a process, at the end of N images the totality of the image will have been encoded in Intraframe by successive zones, which makes it possible to operate thus and to return to a progressive encoding, allowing the transmission of an image encoded in Intraframe mode every N images.

According to a further non-limitative embodiment of the process of choosing the first zone, it is stated that this choice can be made for each successive current image by selecting a zone to be encoded from N–(p–1) in an exhaustive pseudo-random fashion. In this hypothesis, the image zone, which in the previous image was encoded in Intraframe mode, is then encoded with a reduced quantization step.

It is thus understood that it is also possible to encode the whole of an image in Intraframe mode over N images, the exhaustive pseudo-random selection making it possible to deplete all of the zones to be encoded in Intraframe mode.

An example of implementation of the method that is the subject of the invention applied to video surveillance, as shown in FIG. 3a, will now be described in connection with FIG. 3b when applied to video surveillance images of a construction site for example.

With reference to FIG. 3b, the image is then divided into arbitrary zones, typically 3 lines of blocks of 16×16 pixels, i.e. 48 pixels high over the length of the image for example.

For each zone to be encoded $F_{pj}$, the quantization step to be applied $Q_{j0}$, $Q_{sj-1}$ or $Q_{jr}$ is modified according to the estimated size $\hat{T}$ of the image. If this image exceeds the target size Tc the quantization step is increased. If the contrary, it is reduced.

In the case of the implementation of the method that is the subject of the invention shown in FIGS. 3a and 3b, the complexity of certain zones is adjusted, by artificially reducing the quantization step in order to favour the quality of these zones. The first image zone encoded in Intraframe is thus always assumed to have a complexity greater than those of the zones encoded in Interframe mode and therefore systematically encoded first. This zone has the rank 0 in FIG. 3b and therefore corresponds to the choice of the first zone in step c1 of FIG. 3a.

After the encoding of the above-mentioned first zone, there follows the encoding of the zone situated above this first-chosen zone encoded in Intraframe mode, this zone having the rank 1 in FIG. 3b. This makes it possible to avoid degrading the quality of the zones which have just been refreshed by Intraframe encoding. By refreshed zones is meant the set of zones which have been encoded in Intraframe mode since the start of the progressive refreshing.

Finally, the remaining zones are then classified according to their complexity and are encoded in decreasing order of their complexity according to the method that is the subject of the invention, as previously shown and described in connection with FIGS. 2a and 2b. The zones encoded in FIG. 3b successively have the ranks 2, 3, 4 and 5 to 14 according to their complexity and without relation to their location in the image Fk.

It is stated however that, within the framework of the standard H.264, this procedure is made possible using several tools which guarantee the independence of the data between the zones.

Moreover, it must be emphasized that the encoding order is not necessarily correlated with the order of sending packets over the network for the transmission of video image sequences. In fact, the packets can be encoded in one order, i.e. according to their complexity and not according to the geometry of the image, then they can be reorganized and sent in the standard order corresponding to the geometrical encoding of the above-mentioned image.

This procedure makes it possible to improve the compatibility with commercially-available remote decoders.

FIG. 3b shows the division of the image into different zones, the choice of the first zone denoted 0 corresponding to the encoding in Intraframe mode and showing above the latter the zone called "inter constraint" the time prediction of which is restricted to itself, so as not to use any data from the zone situated below the Intraframe zone.

The encoding order of the different remaining image zones to be encoded is then determined according to the complexity of these zones using a criterion of the sum of the absolute difference values, as described previously in the description.

Table T below gives a schematic representation of the prediction error associated with each zone.

| Standard order | Complexity | Modified order | $\epsilon_j$ error | Standard $\epsilon$ | Invention $\epsilon$ |
|---|---|---|---|---|---|
| 0 | 1000 | 11 | 100 | 5110 | 5110 |
| 1 | 800 | 12 | 80 | 5010 | 3310 |
| 2 | 500 | 14 | 50 | 4930 | 2910 |
| 3 | 4000 | 1 | 400 | 4880 | 2520 |
| 4 | 18000 | 0 | 1800 | 4480 | 2140 |
| 5 | 2000 | 9 | 200 | 2680 | 1790 |
| 6 | 3000 | 6 | 300 | 2480 | 1470 |
| 7 | 3900 | 2 | 390 | 2180 | 1170 |
| 8 | 3500 | 4 | 350 | 1790 | 900 |
| 9 | 3800 | 3 | 380 | 1440 | 650 |
| 10 | 2700 | 7 | 270 | 1060 | 450 |
| 11 | 2500 | 8 | 250 | 790 | 300 |
| 12 | 1500 | 10 | 150 | 540 | 200 |
| 13 | 700 | 13 | 70 | 390 | 120 |
| 14 | 3200 | 5 | 320 | 320 | 50 |

It is assumed a priori in a completely arbitrary and imprecise manner that the bit error is equal to 10% of the complexity. In an actual case, the error can frequently reach 50% of the actual size as well as the global error which at the time of encoding the current zone to be encoded, affects the estimated size $\hat{T}$ of the image.

For reasons of clarity, it is assumed that the zones are encoded strictly in the same fashion in both cases, i.e. that improved estimation of the image size does not influence the manner of encoding each zone. In an actual case, the quantization step of each zone is influenced by the estimated size of the image.

On viewing the above-mentioned table T it is noted that the implementation of the method that is the subject of the invention makes it possible to reduce the error obtained to a very large extent in relation to the standard error, "invention $\epsilon$"

compared to "standard ε", and therefore makes it possible to make very fine adjustment to the quantization step for each zone. The result is an image which very precisely complies with the fixed target bit rate.

Figure 3C:
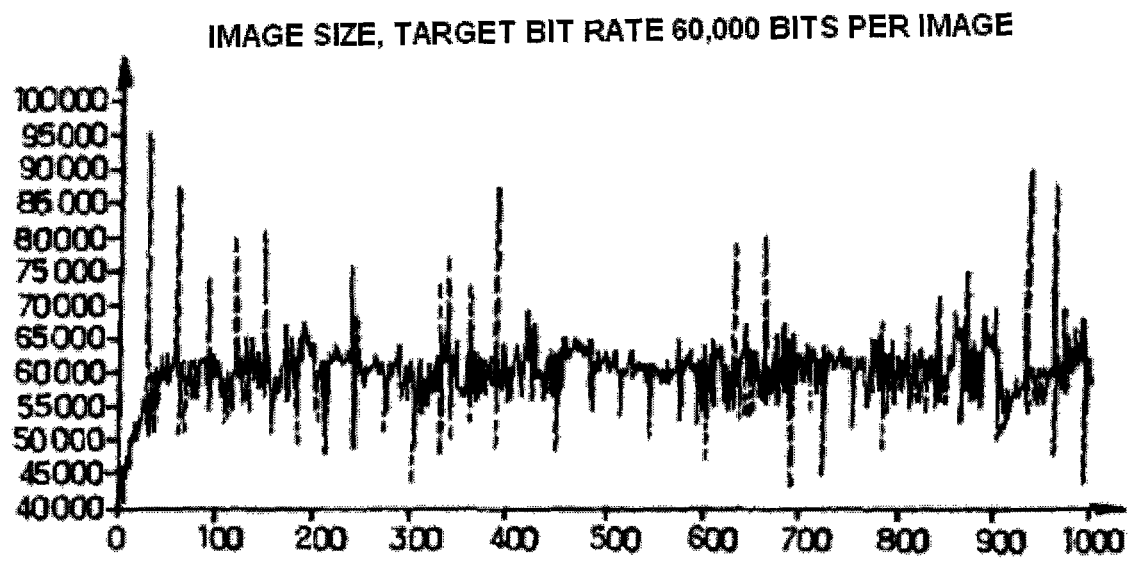
FIG. 3c shows, for the purposes of illustration, a representative timing chart, for the purposes of comparison, of the number of bits per image during a typical video surveillance sequence, respectively in the absence and in the presence of implementation of the method that is the subject of the invention.

The benefit actually obtained by implementing the method that is the subject of the invention can be shown with reference to FIG. 3c.

The above-mentioned FIG. 3c is a graph showing the number of bits per image during the encoding of a typical video surveillance sequence implementing the method that is the subject of the invention, in continuous line, and without implementing the latter, in dotted line. It is very clearly apparent that the bit rate is much better complied with when the method that is the subject of the invention is implemented, the bit rate fluctuations being substantially filtered, the set value Tc=60000 bits for the target size of each encoded image being substantially complied with.

A more detailed description of a device for regulating the encoding bit rate of video image sequences, with regard to a target bit rate represented by a target image size, according to the subject of the present invention and of course allowing the method that is the subject of the invention to be implemented will now be given in connection with FIG. 4.

Generally, it is stated that the device that is the subject of the invention can be incorporated into a more complex video encoder or implemented on an autonomous machine allowing actual video encoding.

In both cases, the video images are subdivided into a set of zones to be encoded and the estimated size of the set of zones to be encoded is a function of the size of the encoded zones, the estimated size of the zones to be encoded and an estimated encoding error of the zones to be encoded, as mentioned previously in the description.

The device that is the subject of the invention, apart from the standard elements such as an input/output port, denoted I/O, digital data representing a video image to be encoded or encoded data and a central processing unit, denoted CPU, combined with a working memory RAM advantageously comprises a module M1 for discrimination the encoding complexity of the zones to be encoded from the set of zones to be encoded, a module M2 for classifying the zones to be encoded according to an order of decreasing complexity and a module M3 for successive encoding of each zone to be encoded, according to the above-mentioned order of complexity classification, successively minimizing the estimated encoding error of each zone to be encoded, the final size of each image with regard to the target size and thus optimizing the bit rate of the video image sequence.

Figure 4:
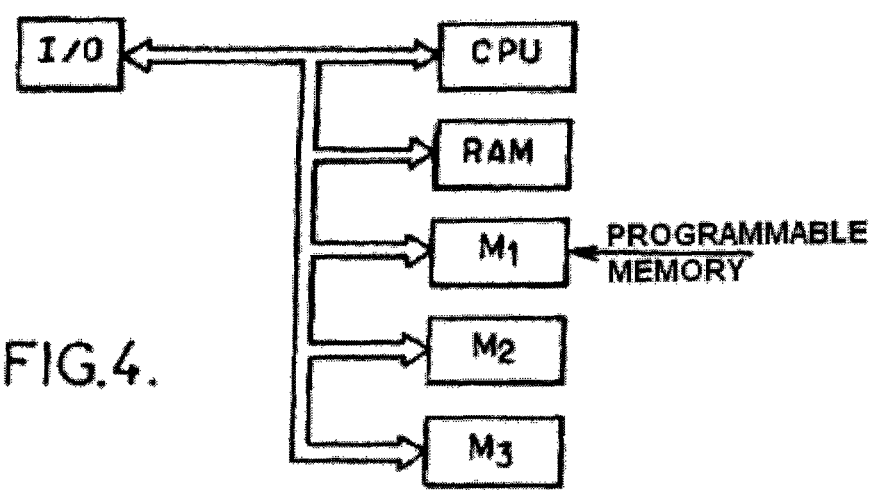
FIG. 4 shows, for the purposes of illustration, a functional block diagram of a device for regulating the bit rate of encoding of video image sequences that is the subject of the invention, making it possible to implement the method and/or any application of the latter to video surveillance.

Preferably, as shown in FIG. 4, the discrimination module M1, the classifying module M2 and the module M3 for successively encoding each zone to be encoded according to the order of complexity classification, are each advantageously constituted by a computer program module installed in a single or multiple program memory module.

Finally, as regards the program memory incorporating module M1, the module for discrimination, among the zones to be encoded of the set of the zones to be encoded, the encoding complexity of each zone to be encoded, it is stated that the latter can be constituted by a programmable memory.

Such a programmable memory then makes it possible to adapt the process of discrimination the encoding complexity of each zone to be encoded according to the content of one or more video image sequences for example.

It is thus possible to adapt the process of discrimination the above-mentioned complexity according to the content of the video sequences and the corresponding video image streams and to carry out an adaptive temporal processing of the stream of video images.

Finally, the invention relates to a computer program product making it possible to implement the method that is the subject of the invention, as described in connection with FIGS. 2a to 3c, such a program product being installed for execution by a computer, as shown in FIG. 4, in one or more program modules, such as the above-mentioned modules M1, M2 and M3.

The invention claimed is:

1. A method for regulating an encoding bit rate of video image sequences with regard to a target bit rate represented by a target image size, within the framework of an application to networked video surveillance, including remote control of a video surveillance camera from a host terminal by an operator, for each current image of rank p belonging to successive sequences of N images, $1 \leq p \leq N$, said video images being subdivided into a set of zones to be encoded, the estimated size of said set of zones to be encoded being a function of the size of the encoded zones, the estimated size of the zones to be encoded and an estimated encoding error of the zones to be encoded, wherein the method comprises at least, for each image, prior to any encoding of a zone:

subdividing each current image into a set of N superimposed zones to be encoded, each constituted by a plurality of lines of pixels;

discriminating, among the zones to be encoded of said set of zones to be encoded, an encoding complexity of each zone to be encoded, said encoding complexity of each zone to be encoded being defined as the estimated size in bytes occupied by said zone to be encoded after encoding, for a determined zone and image quality;

classifying said zones to be encoded according to a determined order of complexity and choosing one of the zones to be encoded as a first zone to be encoded and applying an Intraframe encoding, with a minimum quantization step, in order to obtain a maximum encoding complexity for said first zone to be encoded;

encoding in Interframe encoding an adjacent zone to be encoded immediately above said first zone, applying a reduced quantization step, in order to retain a fineness of encoding of this zone;

encoding each of remaining zones to be encoded in Interframe encoding, according to the order of decreasing complexity classification, successively minimizing the estimated encoding error of each remaining zone to be encoded and the final size of said current image with regard to said target size and optimizing the bit rate of the sequence of video images, wherein the minimization of the estimated error comprises at least adapting successively a quantization step to be applied to the encoding of each zone to be encoded; and successively repeating above operations for each image of rank p+1 following said current image, choosing as first zone to be encoded one of the zones to be encoded having a rank different from the rank of the zones encoded as first zone to be encoded from the preceding p images, which makes it possible to retain the random access to the sequences of images.

2. The method according to claim 1, wherein said encoding complexity of each zone to be encoded is estimated on the basis of at least a quantization step to be applied during the encoding process, metrics of the zone to be encoded of the current image with regard to at least one encoded zone of a previous image.

3. The method according to claim 1, wherein the operation of choosing a first zone to be encoded for each successive current image is carried out by circular permutation of a zone to be encoded among N.

4. The method according to claim 1, wherein the operation of choosing a first zone to be encoded for each successive current image is carried out by selecting a zone to be encoded among N−(p−1) in an exhaustive pseudo-random manner.

5. A device for regulating the encoding bit rate of video image sequences with regard to a target bit rate represented by a target image size, within the framework of an application to networked video surveillance, including remote control of a video surveillance camera from a host terminal by an operator, for each current image of rank p belonging to successive sequences of N images, $1 \leq p \leq N$, in which said video images are subdivided into a set of zones to be encoded, and each current image is subdivided into a set of N superimposed zones to be encoded, each constituted by a plurality of lines of pixels, the estimated size of said set of zones to be encoded being a function of the size of the encoded zones, the estimated size of the zones to be encoded and an estimated encoding error of the zones to be encoded, wherein, apart from an input/output port for digital data representing video images to be encoded and respectively being encoded, a central processing unit and a working memory, said device comprises at least:

means of discrimination, from zones to be encoded among said set of zones to be encoded, the encoding complexity of each zone to be encoded, the encoding complexity of each zone to be encoded being defined as an estimated size in bytes occupied by said zone to be encoded after encoding, for a determined zone and image quality;

means of classifying said zones to be encoded according to an order of decreasing complexity and means for choosing one of the zones to be encoded as a first zone to be encoded and applying an Intraframe encoding, with a minimum quantization step, in order to obtain a maximum encoding complexity for said first zone to be encoded;

means of successively encoding in Interframe encoding an adjacent zone to be encoded immediately above said first zone and applying a reduced quantization step, in order to retain a fineness of encoding of this zone, and encoding each of remaining zones to be encoded in Interframe encoding, according to the order of decreasing complexity classification, successively minimizing the estimated encoding error of each remaining zone to be encoded and the final size of said current image with regard to said target size and optimizing a bit rate of the video image sequence; and means for successively repeating above operations for each image of rank p+1 following said current image, choosing as first zone to be encoded one of the zones to be encoded having a rank different from the rank of the zones encoded as first zone to be encoded from the preceding p images, which makes it possible to retain the random access to the sequences of images.

6. The device according to claim 5, wherein said discrimination means, said classifying means and said successive means of encoding of each zone to be encoded according to the order of complexity classification are each constituted by a computer program module installed in a single or multiple program memory module.

7. The device according to claim 6, wherein said program memory incorporating said module for discrimination, among the zones to be encoded of said set of zones to be encoded, the encoding complexity of each zone to be encoded is constituted by a programmable memory, which makes it possible to adapt the process of discrimination the encoding complexity of each zone to be encoded, according to the content of one or more video image sequences.

8. A non-transitory computer readable medium comprising code instructions for performing the method as claimed in claim 1.

\* \* \* \* \*